United States Patent
Kataria et al.

(10) Patent No.: US 10,621,508 B2
(45) Date of Patent: Apr. 14, 2020

(54) METHOD AND SYSTEM FOR CORRELATION DETECTION IN MULTIPLE SPATIO-TEMPORAL DATASETS FOR EVENT SENSING

(71) Applicant: CONDUENT BUSINESS SERVICES, LLC, Florham Park, NJ (US)

(72) Inventors: Saurabh Kataria, Rochester, NY (US); Tong Sun, Penfield, NY (US)

(73) Assignee: Conduent Business Services, LLC, Florham Park, NJ (US)

( * ) Notice: Subject to any disclaimer, the term of this patent is extended or adjusted under 35 U.S.C. 154(b) by 771 days.

(21) Appl. No.: 15/242,900

(22) Filed: Aug. 22, 2016

(65) Prior Publication Data

US 2018/0053118 A1 Feb. 22, 2018

(51) Int. Cl.
*G06N 20/00* (2019.01)
*G06F 16/951* (2019.01)

(52) U.S. Cl.
CPC ........... *G06N 20/00* (2019.01); *G06F 16/951* (2019.01)

(58) Field of Classification Search
CPC ........ G06N 20/00; G06F 16/951; G06F 9/542
See application file for complete search history.

(56) References Cited

U.S. PATENT DOCUMENTS

| | | | |
|---|---|---|---|
| 7,080,290 B2 | 7/2006 | James et al. | |
| 8,612,134 B2 | 12/2013 | Zheng et al. | |
| 9,210,201 B2 | 12/2015 | Dale et al. | |
| 2010/0031162 A1* | 2/2010 | Wiser | G06Q 30/0255 715/747 |
| 2012/0158744 A1* | 6/2012 | Tseng | G06F 16/27 707/748 |
| 2014/0156806 A1 | 6/2014 | Karpistsenko et al. | |

(Continued)

OTHER PUBLICATIONS

Chang, R.; Wessel, G.; Kosara, R.; Sauda, E.; Ribarsky, W., "Legible Cities: Focus-Dependent Multi-Resolution Visualization of Urban Relationships," Visualization and Computer Graphics, IEEE Transactions on , vol. 13, No. 6, pp. 1169,1175, Nov.-Dec. 2007.

(Continued)

*Primary Examiner* — Kamran Afshar
*Assistant Examiner* — Imad Kassim
(74) *Attorney, Agent, or Firm* — Jones Robb, PLLC

(57) ABSTRACT

A method and a system are provided for correlation detection in multiple spatio-temporal datasets for event sensing in a geographical area. The method includes extracting datasets, comprising information about one or more events, from one or more data sources. The method further includes identifying a primary data source and secondary data sources from the one or more data sources. The method further includes extracting primary features from the datasets associated with the primary data source and secondary features from the datasets associated with the secondary data sources. The primary features are categorized into one or more categories. The method further includes training classifiers based on the primary features and/or the one or more categories. The method further includes detecting a correlation among the information associated with the one or more events based on a category transfer distribution from the primary data source to the secondary data sources.

18 Claims, 4 Drawing Sheets

(56) References Cited

U.S. PATENT DOCUMENTS

| | | | |
|---|---|---|---|
| 2015/0161237 A1* | 6/2015 | Agarwal | G06Q 10/10 |
| | | | 707/749 |
| 2016/0070709 A1* | 3/2016 | Luan | G06Q 30/0282 |
| | | | 707/728 |
| 2016/0125307 A1* | 5/2016 | Zheng | G06N 3/08 |
| | | | 706/12 |
| 2016/0127931 A1* | 5/2016 | Baxley | G06F 16/285 |
| | | | 455/67.16 |

OTHER PUBLICATIONS

Cheng-Kai Chen ; UC Davis, Davis, CA, USA ; Chaoli Wang ; Kwan-Liu Ma ; Wittenberg, A.T., Static correlation visualization for large time-varying volume data, In PACIFICVIS '11 Proceedings of the 2011 IEEE Pacific Visualization Symposium.

Yi Lin, Yoonkyung Lee, and Grace Wahba. Support vector machines for classification in nonstandard situations. Machine Learning, 46(1-3):191-202, Jan. 2002.

Shneiderman, B.. The eyes have it: a task by data type taxonomy for information visualizations. Visual Languages 1996. Proceedings., IEEE Symposium on , vol., No., pp. 336,343, Sep. 3-6, 1996.

Nivan Ferreira, Jorge Poco, Huy T. Vo, Juliana Freire, and Cláudio T. Silva. 2013. Visual Exploration of Big Spatio-Temporal Urban Data: A Study of New York City Taxi Trips. IEEE Transactions on Visualization and Computer Graphics 19, 12 (Dec. 2013).

\* cited by examiner

METHOD AND SYSTEM FOR CORRELATION DETECTION IN MULTIPLE SPATIO-TEMPORAL DATASETS FOR EVENT SENSING

TECHNICAL FIELD

The presently disclosed embodiments are related, in general, to an event sensing system. More particularly, the presently disclosed embodiments are related to method and system for correlation detection in multiple spatio-temporal datasets for event sensing in a geographical area.

BACKGROUND

Recent developments in the field of event sensing are witnessing various advancements in visualization tools to provide a concise and meaningful view of massive information that may aid the cognitive capability of users. The visualization tools are utilized for accomplishing various related tasks, such as, sense making of various data sources, confirmation of event related hypothesis, discovery of new events, and the like. Typically, such visualization tools may receive first datasets from multiple data sources that provide datasets about various events in real-time basis. The visualization tools further receive second datasets from active discussions and/or reporting, done by the users via social media platforms, on-line blogging forums, communication channels, and mobile applications.

In an exemplary scenario, a visualization tool may be utilized by a city agency, such as, disaster recovery agency, to track a progress of a current event, such as, hurricane (which is a natural emergency situation). The tracking may be done based on the first and second datasets (with spatio-temporal dimensions) received from various data sources and social media platforms, respectively. In such a scenario, the visualization tool may summarize and present raw data streams (i.e., the city related events) in a fashion that the city agency may identify and/or validate the correlations among the datasets (about the current event) received from multiple data sources. However, in such scenarios, the first and second datasets, that are the urban datasets, are quite complex in nature. Thus, it may be challenging for standard techniques to correlate such complex datasets received from multiple data sources in real-time, as most of the standard techniques are data-specific and provide sampling-based static solutions. Therefore, there is a desired a method and a system that can effectively and efficiently perform event sensing by detecting correlation in spatio-temporal datasets received from multiple data sources.

Further, limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method for correlation detection among events based on datasets from multiple data sources. The method includes receiving, by a processor at a server, one or more datasets from each of one or more data sources over a communication network. The one or more datasets include at least information about one or more events in a geographical area. The method further includes identifying, by a data processor, a primary data source and one or more secondary data sources from the one or more data sources based on a first pre-defined criteria. The method further includes extracting, by a feature extraction processor at the server, one or more primary features from the one or more datasets associated with the primary data source and one or more secondary features from the one or more datasets associated with the one or more secondary data sources. The one or more primary features are categorized into one or more categories based on a second pre-defined criteria. The method further includes training, by the processor at the server, one or more classifiers based on at least one of the one or more primary features and the one or more categories of the one or more primary features. The method further includes detecting, by the processor, a correlation among the information associated with the one or more events based on a category transfer distribution from the primary data source to the one or more secondary data sources. The one or more secondary features are categorized based on the category transfer distribution using one or more trained classifiers for the determination of the correlation.

According to embodiments illustrated herein, there is provided a system for correlation detection among events based on datasets from multiple data sources. The system includes one or more processors that are configured to receive one or more datasets from each of one or more data sources over a communication network. The one or more datasets include at least information about one or more events in a geographical area. The one or more processors are configured to identify a primary data source and one or more secondary data sources from the one or more data sources based on a first pre-defined criteria. The one or more processors are further configured to extract one or more primary features from the one or more datasets associated with the primary data source and one or more secondary features from the one or more datasets associated with the one or more secondary data sources. The one or more primary features are categorized into one or more categories based on a second pre-defined criteria. The one or more processors are further configured to train one or more classifiers based on at least one of the one or more primary features and the one or more categories of the one or more primary features. The one or more processors are further configured to detect a correlation among the information associated with the one or more events based on a category transfer distribution from the primary data source to the one or more secondary data sources. The one or more secondary features are categorized based on the category transfer distribution using one or more trained classifiers for the determination of the correlation.

According to embodiment illustrated herein, there is provided a computer program product for use with a computer. The computer program product includes a non-transitory computer readable medium. The non-transitory computer readable medium stores a computer program code for correlation detection among events based on datasets from multiple data sources. The computer program code is executable by one or more processors in the computing server to receive one or more datasets from each of one or more data sources over a communication network. The one or more datasets include at least information about one or more events in a geographical area. The computer program code is further executable by the one or more processors to identify a primary data source and one or more secondary data sources from the one or more data sources based on a first pre-defined criteria. The first pre-defined criteria is based on at least one of a reliability score associated with the one or more data sources and a count of datasets extracted from each of the one or more data sources. The computer program code is further executable by one or more processors to extract one or more primary features from the one or more datasets associated with the primary data source and one or more secondary features from the one or more datasets associated with the one or more secondary data sources. The one or more primary features are categorized into one or more categories based on a second pre-defined criteria. The second pre-defined criteria is based on at least a dictionary associated with the primary data source. The computer program code is further executable by one or more processors to train one or more classifiers based on at least one of the one or more primary features and the one or more categories of the one or more primary features. The computer program code is further executable by one or more processors to detect a correlation among the information associated with the one or more events based on a category transfer distribution from the primary data source to the one or more secondary data sources. The one or more secondary features are categorized based on the category transfer distribution using one or more trained classifiers for the determination of the correlation.

BRIEF DESCRIPTION OF DRAWINGS

The accompanying drawings illustrate the various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
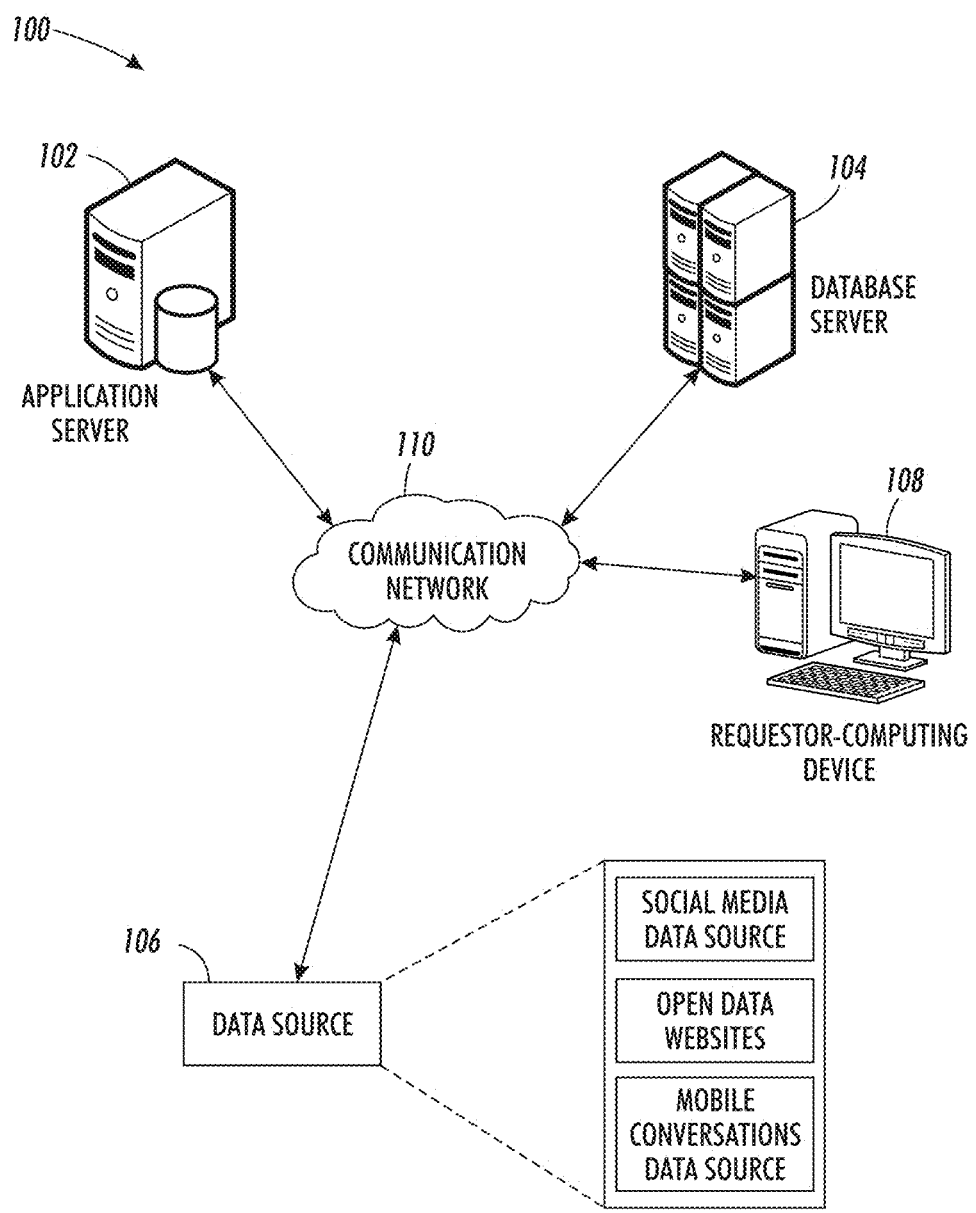
FIG. 1 is a block diagram of a system environment in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "computing device" refers to a computer, a device (that includes one or more processors/microcontrollers and/or any other electronic components), or a system (that performs one or more operations according to one or more sets of programming instructions, code, or algorithms) associated with an individual. In one example, the individual (e.g., a citizen) may utilize the computing device to discuss or report about one or more city related events (e.g., a natural disaster related event, a traffic related event, a pollution related event, and/or the like) on various platforms, such as, one or more social media platforms. In another exemplary scenario, the individual (associated with a city agency that provides services to citizens in a geographical area) may utilize the computing device to view correlated data about one or more events that may be of interest to the individual. Examples of the computing device may include, but are not limited to, a desktop computer, a laptop, a personal digital assistant (PDA), a mobile device, a smartphone, and a tablet computer (e.g., iPad® and Samsung Galaxy Tab®).

An "event" refers to an aberration in at least one of a public service, a public infrastructure, a private service, or a private infrastructure. In an embodiment, the event may also correspond to a natural disaster or an environmental problem. In an embodiment, the event may be reported by at least one individual by use of one or more event reporting platforms, such as, social media platforms, mobile applications, and/or the like.

A "dataset" refers to data about one or more events that may have been collected from one or more individuals around the globe over a communication platform. For example, the one or more individuals from a city may have observed an aberration in at least one of a public service, a public infrastructure, a private service, or a private infrastructure. Based on the observations, the one or more individuals may have reported or discussed the aberration on various platforms, such as, social media platforms. The one or more users may also report or discuss about natural disasters or environmental problems. Hereinafter, the term "dataset" is interchangeably referred to as "crowd-sensed data."

A "data source" refers to a source from which data, related to one or more events reported by one or more individuals, may be extracted. Examples of the data source may correspond to one or more of, but is not limited to, a social media source, an open online forum, a mobile application, and an online web source.

A "category" refers to a type of event or objection. For example, the category of an event may correspond to at least one of, but not limited to, traffic, potholes, non-operational street lamp, fire, noise, pollution, illegal parking, and plumbing. Further, in an embodiment, the category may correspond to one or more domains, such as, a business domain, a health domain, a traffic domain, a society domain, a regional domain, and/or the like.

A "pre-defined criteria" refers to a requirement or constraint that is required for categorizing one or more features into one or more categories. In an embodiment, a requestor may define the criteria, and thereafter, may transmit the defined criteria to a computing server.

A "user interface (UI)" refers to an interface or a platform that may facilitate a user to interact with an associated computing device, such as, a computer, a laptop, or smartphone. The user may utilize various input mediums to interact with the UI such as, but are not limited to, a keypad, mouse, joystick, any touch-sensitive medium (e.g., a touchscreen or touch sensitive pad), voice recognition, gestures, video recognition, and so forth. Hereinafter, the term "UI" is interchangeably referred to as "GUI."

"One or more classifiers" refer to one or more statistical and/or mathematical models that may be configured to classify a set of data (e.g., tweets) into one or more predefined categories. Such classification may be utilized to detect a correlation among datasets for event sensing in a geographical area. In an embodiment, prior to the classification, the one or more classifiers are trained based on a set of features and corresponding categories. Examples of the one or more classifiers may include, but are not limited to, a Logistic Regression, a Random Forest (RF) model, a Gaussian Naive Bayes (Gaussian NB), and/or a Bernauli Naive Bayes (Bernauli NB).

FIG. 1 is a block diagram of a system environment in which various embodiments of a method and a system for correlation detection among events based on spatio-temporal datasets received from multiple data sources may be implemented. With reference to FIG. 1, there is shown a system environment 100 that includes an application server 102, a database server 104, a data source 106, a requestor-computing device 108, and a communication network 110. The application server 102, the database server 104, the data source 106, and the requestor-computing device 108 are communicatively coupled with each other over the communication network 110. For simplicity, FIG. 1 shows one application server, such as, the application server 102, one database server, such as, the database server 104, one data source, such as, the data source 106, and one requestor-computing device, such as, the requestor-computing device 108. However, it will be apparent to a person having ordinary skill in the art that the disclosed embodiments may also be implemented using multiple applications servers, multiple database servers, multiple data sources, and multiple requestor-computing devices, without deviating from the scope of the disclosure.

The application server 102 may refer to a computing device or a software framework hosting an application or a software service that may be communicatively coupled to the communication network 110. In an embodiment, the application server 102 may be implemented to execute procedures such as, but not limited to, the one or more sets of programs, instructions, code, routines, or scripts stored in one or more memory units for supporting the hosted application or the software service. In an embodiment, the hosted application or the software service may be configured to perform one or more associated operations of the application server 102.

In an embodiment, the application server 102 may be configured to extract one or more datasets from each of one or more data sources, such as, the data source 106. The one or more datasets may include information about one or more events in one or more geographical areas. The one or more datasets may further include at least a type of the one or more events and spatio-temporal information of the one or more events. The one or more data sources may correspond to one or more of, but are not limited to, one or more social media sources, one or more open data websites, one or more databases storing telephonic or mobile conversations, and one or more complaint databases associated with one or more domains.

After extracting the one or more datasets from the one or more data sources, in an embodiment, the application server 102 may be configured to identify a primary data source and one or more secondary data sources from the one or more data sources. The application server 102 may identify the primary data source and the one or more secondary data sources from the one or more data sources based on at least a first pre-defined criteria. In an embodiment, the application server 102 may be further configured to identify a label dictionary corresponding to the identified primary data source. The label dictionary may be utilized to categorize data items (i.e., primary features) in the primary data sources.

Further, in an embodiment, the application server 102 may be configured to extract one or more primary features from the one or more datasets associated with the primary data source. The one or more primary features are extracted based on at least content and spatio-temporal information associated with the one or more datasets. The application server 102 may be configured to categorize the one or more primary features into one or more categories based on a second pre-defined criteria. In an embodiment, the application server 102 may be further configured to extract one or more secondary features from the one or more datasets associated with the one or more secondary data sources. The one or more secondary features are extracted based on at least content and spatio-temporal information associated with the one or more datasets.

Further, in an embodiment, the application server 102 may be configured to train one or more classifiers based on at least the one or more primary features and/or the one or more categories of the one or more primary features. Thereafter, the application server 102 may be configured to detect a correlation among the information associated with the one or more events. The correlation may be detected based on at least a category transfer distribution from the primary data source to the one or more secondary data sources. The one or more secondary features are categorized based on the category transfer distribution using one or more trained classifiers for the detection of the correlation among the information associated with the one or more events.

Further, in an embodiment, the application server 102 may receive one or more requests from one or more requestor-computing devices, such as, the requestor-computing device 108 over the communication network 110. The one or more requestors, associated with the one or more requestor-computing devices, may be interested to determine the current status of the one or more events in the geographical area. Therefore, the application server 102 may receive the one or more requests along with one or more preferences for the one or more events and the one or more data sources from the one or more requestors. Based on the received one or more requests, the application server 102 may be configured to render the determined one or more categories of the one or more datasets on a user interface displayed on a display screen of the requestor-computing device 108. The application server 102 may be further configured to render one or more graphical representations of the determined one or more categories on the user interface. The one or more graphical representations are representative of at least one of a spatial distribution, a temporal distribution, and a frequency distribution of the one or more datasets comprising the information about the one or more events. The various associated operations of the application server 102 has been described in detail in conjunction with FIG. 3.

The application server 102 may be realized through various types of application servers such as, but not limited to, a Java application server, a .NET framework application server, a Base4 application server, a PHP framework application server, or any other application server framework.

The database server 104 may refer to a computing device or a storage device that may be communicatively coupled to the communication network 110. In an embodiment, the database server 104 may be configured to perform one or more database operations. Examples of the one or more database operations may include receiving/transmitting one or more queries, request, data, or content from/to one or more computing devices. The one or more database operations may further include processing and storing the one or more queries, request, data, or content. For example, the database server 104 may be configured to store the one or more datasets extracted from the one or more data sources, such as, the data source 106. Further, the database server 104 may be configured to store the one or more primary features and the one or more secondary features extracted from the one or more datasets associated with the primary data source and the one or more secondary data sources, respectively. Further, in an embodiment, the database server 104 may be configured to store the detected correlation among the information associated with the one or more events for each of one or more locations associated with the geographical area corresponding to each defined time duration.

Further in an embodiment, the database server 104 may be configured to store one or more sets of instructions, code, scripts, or programs that may be retrieved by the application server 102 to perform the one or more associated operations. For querying the database server 104, one or more querying languages may be utilized, such as, but not limited to, SQL, QUEL, and DMX. In an embodiment, the database server 104 may be realized through various technologies such as, but not limited to, Microsoft® SQL Server, Oracle®, IBM DB2®, Microsoft Access®, PostgreSQL®, MySQL® and SQLite®, MongoDB®, and/or the like.

A person having ordinary skill in the art will understand that the scope of the disclosure is not limited to the database server 104 as a separate entity. In an embodiment, the functionalities of the database server 104 may be integrated into the application server 102, and/or vice-versa, without deviating from the scope of the disclosure.

The data source 106 may refer to a communication channel or a platform that may be utilized by one or more individuals (e.g., one or more citizens) to discuss or report about the one or more events that may have occurred in and around their current location. The one or more events may correspond to one or more aberrations in at least one of a public service, a public infrastructure, a private service, or a private infrastructure.

In an embodiment, the data source 106 may correspond to one or more of, but is not limited to, a social media source, an open data website, a conversation database (storing telephonic or mobile conversations), a complaint database associated with one or more domains, an open online forum, a mobile application, and an online web source. In case of occurrences of the one or more events, the one or more citizens may utilize their corresponding computing devices, such as, a smartphone, a laptop, or a smart watch, to report about the one or more events on the one or more data sources, such as, the data source 106. The one or more citizens may report the one or more events on the data source 106 through multimedia content. For example, the multimedia content may comprise content, such as, one or more text messages and one or more audio or video clips, which may be posted, liked, disliked, or shared by the one or more citizens on the data source 106. The data source 106 may store the reported data as a dataset in a local memory or a global memory associated with the data source 106 that may be retrieved by the application server 102 to perform the one or more associated operations. For querying the data source 106, one or more querying languages may be utilized, such as, but not limited to, SQL, QUEL, and DMX.

The requestor-computing device 108 may refer to a computing device (associated with a requestor) that may be communicatively coupled to the communication network 110. The requestor may correspond to an individual, such as, an administrator associated with a city agency, who may utilize the requestor-computing device 108 to transmit a request to the application server 102 or the database server 104 over the communication network 110. The request may include at least a query and the one or more preferences for the one or more events in the one or more locations of the geographical area.

The requestor-computing device 108 may include one or more processors in communication with one or more memory units. Further, in an embodiment, the one or more processors may be operable to execute one or more sets of computer-readable code, instructions, programs, or algorithms, stored in the one or more memory units, to perform one or more operations. In an embodiment, the requestor may utilize the requestor-computing device 108 to communicate with the application server 102 or the database server 104, via the communication network 110.

The requestor-computing device 108 may further include a display screen that may be configured to display one or more GUIs rendered by the computing server, such as, the application server 102. For example, the application server 102 may render the one or more graphical representations of the determined one or more categories of the one or more events. The one or more graphical representations are representative of at least a spatial distribution, a temporal distribution, and a frequency distribution of the one or more datasets.

Examples of the requestor-computing device 108 may include, but are not limited to, a personal computer, a laptop, a personal digital assistant (PDA), a mobile device, a tablet, or any other computing devices.

The communication network 110 may include a medium through which devices, such as, the application server 102, the database server 104, the data source 106, and the requestor-computing device 108 may communicate with each other. Examples of the communication network 110 may include, but are not limited to, the Internet, a cloud network, a Wireless Fidelity (Wi-Fi) network, a Wireless Local Area Network (WLAN), a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), and/or a Metropolitan Area Network (MAN). Various devices in the system environment 100 may be configured to connect to the communication network 110, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as, Long Term Evolution (LTE), Light Fidelity (Li-Fi), and/or other cellular communication protocols or Bluetooth (BT) communication protocols.

Figure 2:
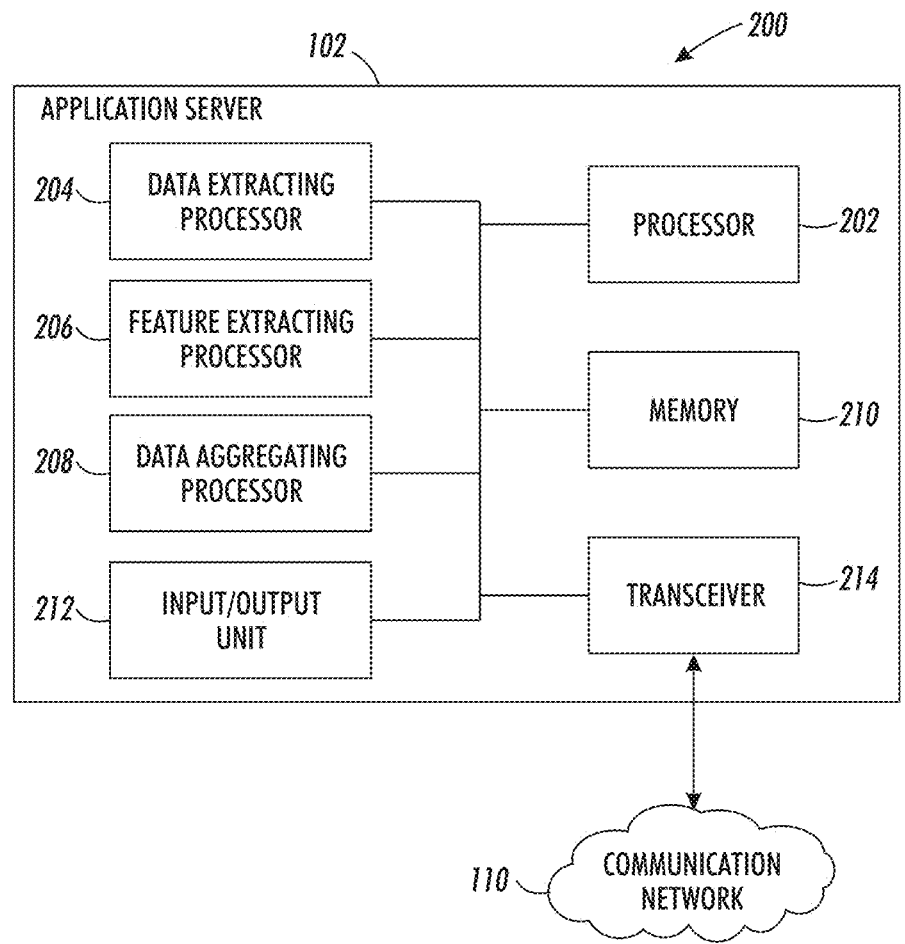
FIG. 2 is a block diagram that illustrates a computing server for auto-allocation of tasks to resources, in accordance with at least one embodiment.

FIG. 2 is a block diagram that illustrates a system for correlation detection among events based on datasets from multiple data sources, in accordance with at least one embodiment. With reference to FIG. 2, there is shown a system 200 that may include one or more processors, such as, a processor 202, one or more data extracting processors, such as, a data extracting processor 204, one or more feature extracting processors, such as, a feature extracting processor 206, one or more data aggregating processors, such as, a data aggregating processor 208, one or more memory units, such as, a memory 210, one or more input/output (I/O) units, such as, an I/O unit 212, and one or more transceivers, such as, a transceiver 214.

The system 200 may correspond to a computing server, such as, the application server 102, or a computing device, such as, the requestor-computing device 108, without departing from the scope of the disclosure. However, for the purpose of the ongoing description, the system 200 corresponds to the application server 102.

The processor 202 comprises suitable logic, circuitry, interfaces, and/or code that may be configured to execute one or more sets of instructions, programs, or algorithms stored in the memory 210 to perform the one or more associated operations. For example, the processor 202 may be configured to identify the primary data source and the one or more secondary data sources from the one or more data sources. Further, the processor 202 may train the one or more classifiers based on the one or more primary features and the one or more categories of the one or more primary features. The processor 202 may be further configured to detect the correlation among the information associated with the one or more events based on at least the category transfer distribution from the primary data source to the one or more secondary data sources. The one or more secondary features are categorized based on the category transfer distribution using the one or more trained classifiers for the detection of the correlation among the information associated with the one or more events. In an embodiment, the processor 202 may be communicatively coupled to the data extracting processor 204, the feature extracting processor 206, the data aggregating processor 208, the memory 210, the I/O unit 212, and the transceiver 214. The processor 202 may be implemented based on a number of processor technologies known in the art. Examples of the processor 202 may include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The data extracting processor 204 comprises suitable logic, circuitry, interfaces, and/or code that may be configured to execute the one or more sets of instructions, programs, code, or algorithms stored in the memory 210 to perform the one or more associated operations. For example, the data extracting processor 204 may be configured to extract the one or more datasets, comprising the information about the one or more events, from the one or more data sources, such as, the data source 106. In an embodiment, the data extracting processor 204 may be communicatively coupled to the processor 202, the feature extracting processor 206, the data aggregating processor 208, the memory 210, the I/O unit 212, and the transceiver 214. The data extracting processor 204 may be implemented based on a number of processor technologies known in the art. For example, the data extracting processor 204 may be implemented using one or more of, but not limited to, an X86-based processor, a RISC processor, an ASIC processor, a CISC processor, and/or other processor. Examples of data extracting processor 204 may include, but not limited to PTC® Arbotext, Adobe® Framemaker, LyX®, and/or BroadVision QuickSilver®.

The feature extracting processor 206 comprises suitable logic, circuitry, interfaces, and/or code that may be configured to execute the one or more sets of instructions, programs, code, or algorithms stored in the memory 210 to perform the one or more associated operations. For example, the feature extracting processor 206 may be configured to extract the one or more primary features from the one or more datasets associated with the primary data source. The feature extracting processor 206 may be further configured to extract the one or more secondary features from the one or more datasets associated with the one or more secondary data sources. The feature extracting processor 206 may be communicatively coupled to the processor 202, the data extracting processor 204, the data aggregating processor 208, the memory 210, the I/O unit 212, and the transceiver 214. The feature extracting processor 206 may be implemented based on a number of processor technologies known in the art. For examples, the feature extracting processor 206 may be implemented using one or more of, but not limited to, an X86-based processor, a RISC processor, an ASIC processor, a CISC processor, and/or other processor.

The data aggregating processor 208 comprises suitable logic, circuitry, interfaces, and/or code that may be configured to execute the one or more sets of instructions, programs, code, or algorithms stored in the memory 210 to perform the one or more associated operations. For example, the data aggregating processor 208 may be configured to aggregate the one or more events based on at least the time, the location, and the category associated with the one or more events. The data aggregating processor 208 may be communicatively coupled to the processor 202, the data extracting processor 204, the feature extracting processor 206, the memory 210, the I/O unit 212, and the transceiver 214. The data aggregating processor 208 may be implemented based on a number of processor technologies known in the art. For example, the data aggregating processor 208 may be implemented using one or more of, but not limited to, an X86-based processor, a RISC processor, an ASIC processor, a CISC processor, and/or other processor.

The memory 210 may be operable to store one or more machine code and/or computer programs having at least one code section executable by the processor 202, the data extracting processor 204, the feature extracting processor 206, the data aggregating processor 208, the I/O unit 212, and/or the transceiver 214. The memory 210 may store the one or more sets of instructions, programs, code, or algorithms that are executed by the processor 202, the data extracting processor 204, the feature extracting processor 206, the data aggregating processor 208, the I/O unit 212, and/or the transceiver 214 to perform the respective one or more operations. Further, the memory 210 may include one or more buffers (not shown) that may be configured to store information, such as, the one or more requests, the extracted one or more datasets, the one or more primary features, the one or more secondary features, and/or the like. Some of the commonly known memory implementations include, but are not limited to, a random access memory (RAM), a read-only memory (ROM), a hard disk drive (HDD), and a secure digital (SD) card. In an embodiment, the memory 210 may include the one or more machine code, and/or computer programs that are executable by the processor 202, the data extracting processor 204, the feature extracting processor 206, the data aggregating processor 208, the I/O unit 212, and/or the transceiver 214 to perform the one or more specific operations. It will be apparent to a person having ordinary skill in the art that the one or more instructions stored in the memory 210 enables the hardware of the system 200 to perform the one or more associated operations.

The I/O unit 212 comprises suitable logic, circuitry, interfaces, and/or code that may be operable to facilitate an individual, such as, an administrator or the requestor, to input one or more parameter constraints. For example, the administrator may utilize the I/O unit 212 to provide constraints associated with the identification of the primary data source. In another exemplary scenario, the requestor may utilize the I/O unit 212 to input the one or more requests. The I/O unit 212 may be operable to communicate with the processor 202, the data extracting processor 204, the feature extracting processor 206, the data aggregating processor 208, and/or the transceiver 214. Further, in an embodiment, the I/O unit 212, in conjunction with the processor 202 and the transceiver 214, may be operable to provide one or more responses (e.g., the one or more graphical representations) in response to the one or more requests. For example, the one or more responses outputted by the I/O unit 212 may be either in an audio form, a video form, or a text form. Examples of the input devices may include, but are not limited to, a touch screen, a keyboard, a mouse, a joystick, a microphone, a camera, a motion sensor, a light sensor, and/or a docking station. Examples of the output devices may include, but are not limited to, a speaker system and a display screen.

The transceiver 214 comprises suitable logic, circuitry, interfaces, and/or code that may be configured to receive/transmit the one or more queries, data, content, or other information from/to one or more computing devices (e.g., the database server 104 or the requestor-computing device 108) over the communication network 110. The transceiver 214 may implement one or more known technologies to support wired or wireless communication with the communication network 110. In an embodiment, the transceiver 214 may include circuitry, such as, but not limited to, an antenna, a radio frequency (RF) transceiver, one or more amplifiers, a tuner, one or more oscillators, a digital signal processor, a Universal Serial Bus (USB) device, a coder-decoder (CO-DEC) chipset, a subscriber identity module (SIM) card, and/or a local buffer. The transceiver 214 may communicate via wireless communication with networks, such as, the Internet, an Intranet and/or a wireless network, such as, a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Light Fidelity (Li-Fi), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Figure 3:
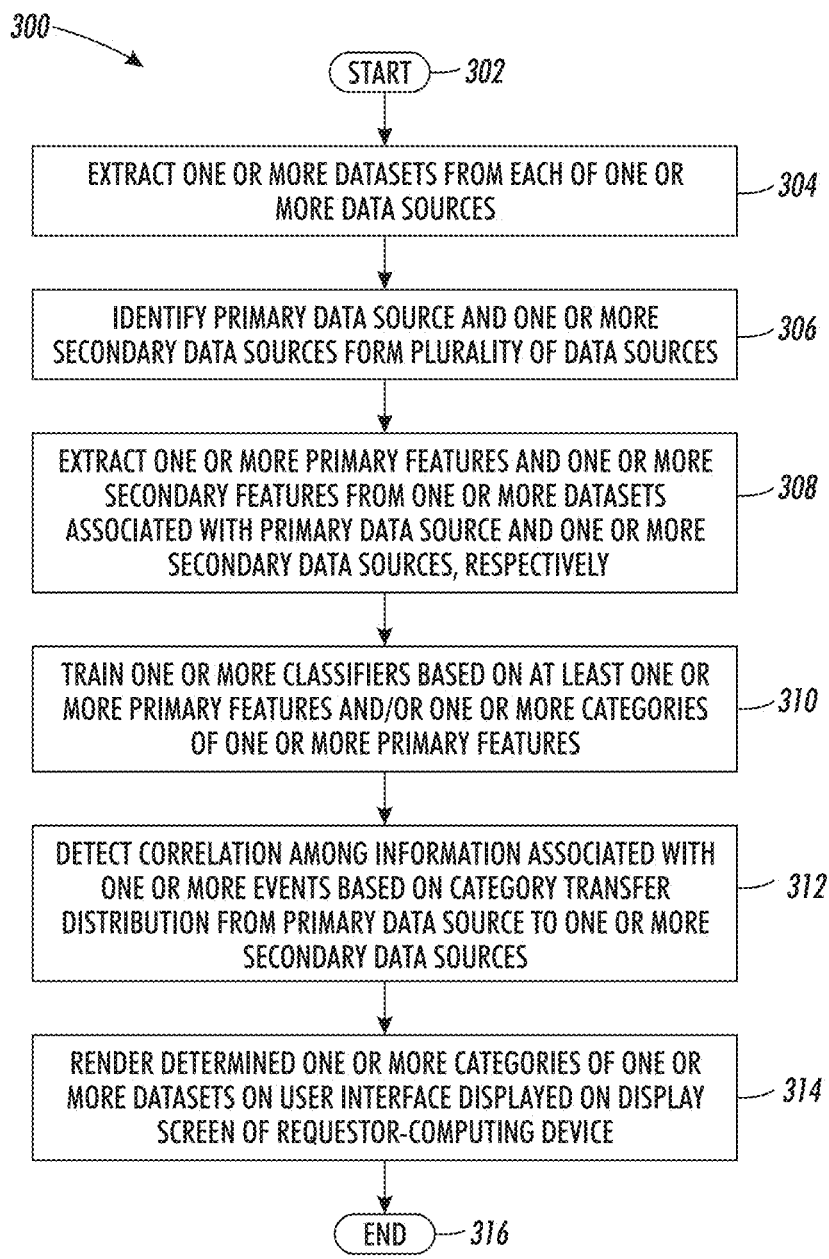
FIG. 3 is a flowchart that illustrates a method for correlation detection among events based on spatio-temporal datasets received from multiple data sources, in accordance with at least one embodiment.

FIG. 3 is a flowchart that illustrates a method for correlation detection among events based on spatio-temporal datasets received from multiple data sources, in accordance with at least one embodiment. With reference to FIG. 3, there is shown a flowchart 300 that is described in conjunction with FIG. 1 and FIG. 2. The method starts at step 302 and proceeds to step 304.

At step 304, the one or more datasets are extracted from each of the one or more data sources. In an embodiment, the data extracting processor 204 may be configured to extract the one or more datasets from each of the one or more data sources, such as, the data source 106 (e.g., TWITTER®). The data source 106 may correspond to at least one of a social media platform (e.g., TWITTER® or FACE-BOOK®), an open data website, a mobile application, a complaint registering database server, and/or the like. Further, the one or more datasets may correspond to the information or data (e.g., the multimedia content) about the one or more events. The one or more events may correspond to the one or more aberrations in at least one of a public service, a public infrastructure, a private service, or a private infrastructure. The one or more aberrations may have occurred in response to one or more natural calamities and/or one or more human actions. For example, an aberration in at least one of a public service, a public infrastructure, a private service, or a private infrastructure may occur due to an earth quake, rainfall, and/or other such climatic disturbances. In another exemplary scenario, the aberration in at least one of the public service, the public infrastructure, the private service, or the private infrastructure may occur due to accidents, riots, and/or the like.

Prior to the extraction of the one or more datasets from the one or more data sources, the one or more individuals (e.g., the one or more citizens) may utilize their respective computing devices to connect with the one or more data sources, such as, the data source 106, over the communication network 110. In an embodiment, the one or more individuals may utilize their respective computing devices to connect with the data source 106 to discuss or report about the one or more events that may have occurred in the vicinity of their present locations. Further, the one or more individuals may perform the one or more actions (e.g., like, dislike, post, or share) through the multimedia content on the data source 106 to discuss or report about the one or more events. Examples of the multimedia content may include, but is not limited to, a text message, an image, an audio clip, and/or a video clip. The one or more individuals, through the multimedia content, may provide the information about the one or more events. For example, the information may include at least the type of the one or more events and/or spatio-temporal data associated with the one or more events. Such multimedia content posted, shared, liked, or disliked by the one or more individuals on the data source 106 may correspond to a dataset.

A person having ordinary skill in the art will understand that the scope of the disclosure is not limited to the multimedia content (posted, shared, liked, or disliked by the one or more individuals on the data source 106) as the one or more datasets. In an embodiment, the one or more datasets may further comprise the data, describing the one or more events, captured by one or more sensing devices (e.g., image or video capturing devices, traffic sensors, collision sensors, heat detectors, and/or the like), without deviating from the scope of the disclosure.

Thereafter, in an embodiment, the data extracting processor 204 may transmit one or more queries to the data source 106 to the extract the one or more datasets from the data source 106. In response to the one or more queries, the data source 106 may retrieve the one or more datasets from its local memory or global memory and thereafter, may transmit the one or more datasets to the transceiver 114 over the communication network 110. After extracting the one or more datasets from the data source 106, the data extracting processor 204, in conjunction with the transceiver 214, may store the extracted one or more datasets in a storage device, such as, the memory 210 or the database server 104.

At step 306, the primary data source and the one or more secondary data sources are identified from the one or more data sources. In an embodiment, the processor 202 may be configured to identify the primary data source and the one or more secondary data sources from the one or more data sources. In an embodiment, the processor 202 may be configured to identify the primary data source and the one or more secondary data sources from the one or more data sources based on the first pre-defined criteria. The first pre-defined criteria may correspond to a set of rules, defined either by the requestor or other concerned individuals, that is utilized by the processor 202 to identify the primary data source and the one or more secondary data sources. In an illustrative example, the first pre-defined criteria may be based on a reliability score associated with each of the one or more data sources. For example, the processor 202 may identify a data source as the primary data source from the one or more data sources, when the reliability score of the data source is maximum (or minimum) amongst the one or more data sources. In such a case, the remaining one or more data sources may be identified as the one or more secondary data sources. The reliability score of the data source may be determined based on at least a historical accuracy of the data source about reporting of a historic event. In another illustrative example, the first pre-defined criteria may be based on a count of datasets extracted from each of the one or more data sources. For example, the processor 202 may identify the data source as the primary data source, when the count of datasets extracted from the data source is highest (or lowest) among the one or more data sources. In such a case, the remaining one or more data sources may be identified as the one or more secondary data sources. In yet another illustrative example, the processor 202 may identify the data source as the primary data source, when the data source is associated with an agency, such as, a government agency or a private city agency, which provides services to the residents of a specific geographical area. In such a case, the remaining one or more data sources may be identified as the one or more secondary data sources.

Further, in an embodiment, the processor 202 may be configured to identify the label dictionary corresponding to the identified primary data source. In an embodiment, the identified label dictionary may be utilized by the processor 202 to categorize the data items (e.g., the one or more primary features) in the identified primary data source into the one or more categories. For the purpose of illustration, the processor 202 considers a complaint dataset, such as, "New York city (NYC) 311" (available via nycopendata.org), as a primary data source. The complaint dataset "New York city (NYC) 311" is associated with a fixed time duration, say "1 month," and a specific geography, say "New York." Accordingly, the processor 202 may identify types of complaints in the complaint dataset as a label dictionary. For the one or more secondary data sources, the processor 202 considers social media stream, for the same time duration and geography, as a secondary data source.

At step 308, the one or more primary features and the one or more secondary features are extracted from the one or more datasets associated with the primary data source and the one or more secondary data sources, respectively. In an embodiment, the feature extracting processor 206 is configured to extract the one or more primary features and the one or more secondary features from the one or more datasets associated with the primary data source and the one or more secondary data sources, respectively. In an embodiment, the feature extracting processor 206 may extract the one or more primary features and the one or more secondary features based on at least the content and spatio-temporal information associated with the one or more datasets. In an embodiment, the extraction of the one or more primary features and the one or more secondary features may be dependent upon their corresponding data sources and domains.

Further, in an embodiment, the processor 202 may be configured to categorize the one or more primary features into the one or more categories based on the second pre-defined criteria. The second pre-defined criteria may be determined based on the label dictionary. For example, the label dictionary corresponding to the primary data source may be utilized to categorize the one or more primary features into the one or more categories. The one or more categories may correspond to at least one of one or more types of objections or events in the geographical area and one or more types of domains associated with the one or more types of objections or events. For example, the one or more types of domains may correspond to at least one of, but are not limited to, a business domain, a health domain, a traffic domain, a society domain, and a regional domain.

For illustrative purpose, the processor 202 may utilize the following sequence of process to extract the one or more primary features and the one or more secondary features from the one or more datasets (e.g., tweets) associated with the primary data source and the one or more secondary data sources, respectively.

Retrieve a twitter shortened URL (e.g., http://t.co/ . . . ) from a tweet.

Get an expanded URL from the shortened URL by a Web connection.

Get a category (label value) for the tweet from the expanded URL according to ODP (Open Directory Project) database.

Learn the classifier from the labeled data where each tweet is represented by a bag of words.

Table-1, as shown below, illustrates the one or more secondary features that are related to the one or more datasets (e.g., the social media dataset) associated with the one or more secondary data sources.

TABLE 1

Features related to social media data

| Feature | Type | Description |
| --- | --- | --- |
| Word 1-grams and 2-grams | 1 integer/ n-gram | The count of n-grams of words that compose the tweet segment |
| Contains email | Boolean | Presence of an email in the tweet segment |
| # upper case | Integer | % of letters in upper case in the tweet segment |

TABLE 1-continued

Features related to social media data

| Feature | Type | Description |
| --- | --- | --- |
| # punctuation | Integer | % of punctuation marks in the tweet segment |
| #Special punctuation | integer | % of "!" and "?" punctuation marks |
| Positive Sentiment | integer | Positive sentiment score of the n-grams |
| Negative Sentiment | integer | Negative sentiment score of the n-grams |

At step 310, the one or more classifiers are trained based on at least the one or more primary features and/or the corresponding one or more categories. In an embodiment, the processor 202 may be configured to train the one or more classifiers based on at least one of the one or more primary features and the one or more categories of the one or more primary features. Examples of the one or more classifiers may include, but are not limited to, a Logistic Regression, a Random Forest (RF) model, a Gaussian Naive Bayes (Gaussian NB), a Bernauli Naive Bayes (Bernauli NB), and/or the like.

At step 312, the correlation among the information associated with the one or more events is detected based on at least the category transfer distribution from the primary data source to the one or more secondary data sources. In an embodiment, the processor 202 may be configured to detect the correlation among the information associated with the one or more events based on at least the category transfer distribution from the primary data source to the one or more secondary data sources. The processor 202 may utilize the trained one or more classifiers to categorize the one or more secondary features into the one or more categories based on at least the category transfer distribution.

For illustrative purpose, given a textual nature of social media datasets, the feature extracting processor 206 may extract descriptive features from an emergency dataset (e.g., description or transcript of call) and thereafter, the processor 202 may train a classifier which in turn can provide categories for the social media datasets based on at least the category transfer distribution.

Cross-domain Category Transfer:

In an embodiment, the processor 202 may formulate a category transfer distribution scheme that may transfer a conditional category distribution of a primary data source, i.e., $P_s(y|x_s)$ to a secondary data source i.e., $P_t(y|x_t)$. Here, $P_s$, $P_t$, $y$, $x_s$, $x_t$, represents a primary data source distribution, a secondary data source distribution, a class label random variable, a primary feature vector, and a secondary feature vector, respectively. The main challenge in transferring the categories from the primary data source to the secondary data source is variation in distribution of categories and data points in the primary data source and the secondary data source. For example, the primary data source, which corresponds to "NYC 311 calls," for example, may have descriptive features (e.g., "noise," "distress," "disturbance," etc.) associated with the categories (e.g., category "NOISE") that are different from the descriptive features (e.g., "gathering," "party," etc.) associated with the secondary data source (e.g., social media). Therefore, the classifier trained based on the primary data source may suffer from a "class imbalance" problem. In order to overcome the "class imbalance" problem, the processor 202 may be configured to utilize a source instance weighting scheme to transfer the primary data source category distribution to the secondary data source category distribution. The primary and secondary data source category distributions, i.e., $P_s(y)$ and $P_t(y)$, stems from domain knowledge and are important to counter the "class imbalance" problem. The weighing scheme may be represented by the following equation (1):

$$P_t(y|x_t) = \frac{\left(\frac{P_t(y)}{P_s(y)}\right) * P_s(y|x_s)}{\sum_y \left(\frac{P_t(y)}{P_s(y)}\right) * P_s(y|x_s)} \quad (1)$$

To empirically learn the primary data source distribution, which then is "transformed" into the secondary data source distribution, the processor 202 may utilize the one or more classifiers that conditionally learns the class distribution. For example, the processor 202 may utilize a logistic regression based classifier to learn the primary data source distribution. Let "$r(y)=P_t(y)/P_s(y)$" be a ratio of class weight distribution between the primary and secondary data source distribution. To learn "$r(y)$," the processor 202 may utilize an assumption that the primary data source and the secondary data source consist their class labels and modify "$r(y)$" to reflect both labels, as expressed in following equation (2):

$$r(y_t, y_s) = \max_i (P_t(y_i)/P_s(y_s)) \quad (2)$$

At step 314, the determined one or more categories of the one or more datasets are rendered on the user interface displayed on the display screen of the requestor-computing device 108. In an embodiment, the processor 202 may be configured to render the determined one or more categories of the one or more datasets on the user interface displayed on the display screen of the requestor-computing device 108. In an embodiment, the processor 202 may render the determined one or more categories of the one or more datasets based on at least a count of occurrences of the one or more events associated with the one or more categories.

Prior to the rendering of the one or more categories, the processor 202 may utilize the data aggregating processor 208 to aggregate the one or more events. For example, the data aggregating processor 208 may aggregate the one or more events based on at least one or more of, but not limited to, a type, a count, an occurrence time, and a determined category associated with each of the one or more events.

For example, when the one or more datasets are preprocessed and stored in the database server 104, the data aggregating processor 208 may aggregate the one or more datasets to speed up the communication between various components. For example, the data aggregating processor 208 may generate a tabular data structure based on at least the type, the count, and the occurrence time associated with each of the one or more events. In such a scenario, each column in the tabular data structure corresponds to the type of an event, each row in the tabular data structure corresponds to a day of occurrence of the event, and a value in each cell is the count of the reported event.

In another exemplary scenario, spatial related queries may be speed up through a spatial index. The spatial index may be created by the processor 202, in conjunction with the database server 104 (e.g., MongoDB®) and the data aggregating processor 208, using geo-location components from the one or more datasets. Another strategy to speed up the spatial component related queries may be realized based on spatial aggregation. In such a case, the processor 202 may utilize a defined fixed grid over the primary data source, where the one or more primary features of the one or more datasets are accumulated in a closest grid location on a time range. Similarly, the data aggregating processor 208 generates the tabular data structure (e.g., a grid) for each type and each day, based on at least frequency aggregations. Based on at least the flexibility of the schema of each tabular data structure on MongoDB®, the processor 202 may generate a graphical representation, such as, a heatmap, based on a grid containing the spatial distribution (i.e., always the same amount of data, instead of all the items respecting the time constraints) received from the data aggregating processor 208.

Further, in an embodiment, the processor 202 may be configured to render the one or more graphical representations of the determined one or more categories on the user interface displayed on the display screen of the requestor-computing device 108. The one or more graphical representations are representative of at least one of a spatial distribution, a temporal distribution, and a frequency distribution of the one or more events in the one or more datasets. In an embodiment, the processor 202, in conjunction with the transceiver 214, may receive one or more input parameters from the requestor-computing device 108 over the communication network 110. The one or more input parameters are indicative of the one or more preferences of the requestor for the one or more graphical representations. Based on the received one or more input parameters, the processor 202 may render one or more updated graphical representations of the one or more categories on the user interface displayed on the display screen of the requestor-computing device 108. An exemplary GUI displaying a graphical representation of the one or more categories has been described later in conjunction with FIG. 4. Control passes to end step 316.

Figure 4:
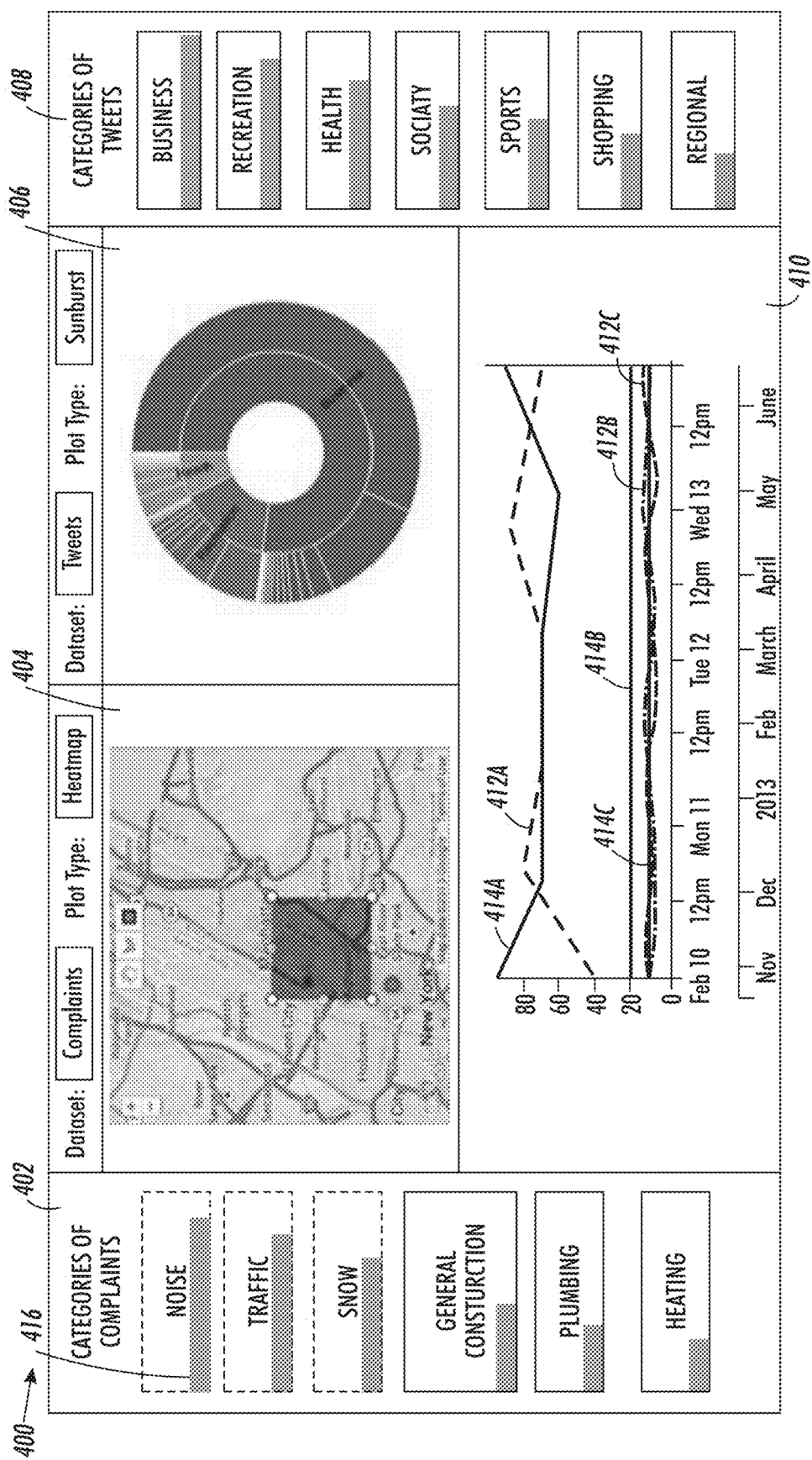
FIG. 4 illustrates a graphical user interface (GUI) displaying detected correlation among multiple spatio-temporal datasets for event sensing in a geographical area, in accordance with at least one embodiment.

FIG. 4 illustrates an exemplary GUI displaying detected correlation among multiple spatio-temporal datasets for event sensing in a geographical area, in accordance with at least an embodiment. With reference to FIG. 4, there is shown a GUI 400 that is described in conjunction with elements from FIG. 1, FIG. 2, and FIG. 3.

In an embodiment, the processor 202, in conjunction with the data aggregating processor 208, may generate the GUI 400, which is rendered on the display screen of the one or more computing devices, such as, the requestor-computing device 108, in response to a request received from the requestor-computing device 108. The GUI 400 may comprise one or more sections, such as, a first section 402, a second section 404, a third section 406, a fourth section 408, and a fifth section 410. For simplicity of the ongoing discussion, the GUI 400 is split into two portions i.e., a left portion (comprising the first section 402 and the second section 404) and a right portion (comprising the third section 406 and the fourth section 408). The left portion and the right portion may be used to represent the preprocessed one or more datasets. Further, in an embodiment, each of the two portions (i.e., the left portion and the right portion) has two views i.e., types view and data view.

In an embodiment, the first section 402 and the fourth section 408 correspond to the types view. The types view may comprise a list of types of events (i.e., complaints or tweets) that are ranked based on a frequency value. The frequency value corresponding to an event type may correspond to at least a count of the event type reported by the one or more citizens. In order to create a visual cue about the distribution of the event type based on the frequency value, the processor 202 may include a graphical indicator 416 which may represent the frequency value of each event.

Further, in an embodiment, the second section 404 and the third section 406 correspond to the data view. In an embodiment, each of the one or more datasets may have many visual graphical representations. For example, the second section 404 shows the complaints. The processor 202 may display the spatial distribution of the complaints through the heatmaps. The third section 406 shows the twitter dataset. The processor 202 may represent the frequency distribution of the twitter dataset through a sunburst plot. Additionally, the processor 202 may provide tag cloud plots to show the frequency distribution of words on each twitter type.

In order to connect the one or more datasets from each of the first section 402 and the fourth section 408, the processor 202 may create a temporal representation as shown in the fifth section 410. The fifth section 410 shows the temporal behavior of each type of datasets (e.g., categories of complaints, categories of tweets, and/or the like). In an embodiment, one or more dashed lines (denoted by 412A, 4128, and 412C) represent the categories of complaints (i.e., noise, traffic, and snow, respectively) from the left portion (i.e., from the first section 402). Similarly, one or more solid lines (denoted by 414A, 414B, and 414C) represent the categories of tweets (e.g., business, recreation, and health, respectively) from the right portion (i.e., from the fourth section 408). In an embodiment, the processor 202 may create the temporal representation in order to display a global and local temporal behavior on the GUI 400. The fifth section 410 further comprises a histogram plot at the bottom part of the fifth section 410. The histogram plot shows the global behavior of the one or more datasets i.e., using the complete time range. The processor 202 may further facilitate the requestor to select a time range on the histogram plot to update the top part of the temporal representation where the requestor may see the temporal frequencies for each type using a time range.

In an embodiment, the GUI 400 is dynamic in nature i.e., the requestor may interact on each section (i.e., the first section 402, the second section 404, the third section 406, the fourth section 408, and the fifth section 410). Moreover, all sections are linked and synchronized to each other, that is, any changes made on any section will update the remaining sections accordingly.

The disclosed embodiments encompass numerous advantages. The disclosure provides a method and a system for correlation detection in multiple spatio-temporal datasets for event sensing in a geographical area. The disclosed system may assist the requestors to correlate events across different data contexts. Further, the aggregation of the preprocessed datasets speeds up the queries with respect to time and type constraints. The disclosed system further provides a visualization platform through which the requestors may interact to view desired responses. The disclosed method supports various paradigms that include constraints to filter data, cross domain label transfer, and event discovery. From a city planner's perspective, it becomes important to explore various data sources for the same event to make effective decisions concerning the consequences of a given event. For example, severe weather conditions detected by weather agency could be complemented by social media stream with various adverse effects in citizens' life that further can help city planning agency to divert recovery resources to a certain area. Therefore, detecting correlated spatio-temporal events in multiple data streams in real-time becomes advantageous to various stakeholders in urban setting.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive, such as, a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for correlation detection in multiple spatio-temporal datasets for event sensing in a geographical area. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person having ordinary skill in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for correlation detection among events based on datasets from multiple data sources, said method comprising:

extracting, by a data extracting processor at a computing server, one or more datasets from each of one or more data sources over a communication network, wherein said one or more datasets include at least information about one or more events in a geographical area;

identifying, by a processor at said computing server, a primary data source and one or more secondary data sources from said one or more data sources based on at least a first pre-defined criteria;

extracting, by a feature extracting processor at said computing server, one or more primary features from said one or more datasets associated with said primary data source, and one or more secondary features from said one or more datasets associated with said one or more secondary data sources, wherein said one or more primary features are categorized into one or more categories based on a second pre-defined criteria;

training, by said processor at said computing server, one or more classifiers based on at least one of said one or more primary features and said one or more categories of said one or more primary features; and detecting, by said processor, a correlation among said information associated with said one or more events based on a category transfer distribution from said primary data source to said one or more secondary data sources, wherein said one or more secondary features are categorized based on said category transfer distribution using one or more trained classifiers for said determination of said correlation, wherein said first pre-defined criteria is based on a set of rules defined by a requestor, a reliability score associated with said one or more data sources, and a count of datasets extracted from each of said one or more data sources, and wherein said second pre-defined criteria is based on at least a dictionary associated with said primary data source.

2. The method of claim 1, wherein said one or more datasets further include at least a type of said one or more events and spatio-temporal information of said one or more events.

3. The method of claim 1, wherein said one or more data sources correspond to one or more of: one or more social media sources, one or more open data websites, one or more databases storing telephonic or mobile conversations, and one or more complaint databases associated with one or more domains.

4. The method of claim 1, wherein said one or more primary features and said one or more secondary features are extracted based on at least content and spatio-temporal information associated with said one or more datasets.

5. The method of claim 1, wherein said one or more categories may correspond to at least one of: one or more types of objections in said geographical area and one or more types of domains, wherein said one or more types of domains correspond to a business domain, a health domain, a traffic domain, a society domain, and a regional domain.

6. The method of claim 1 further comprising rendering, by said processor, said determined one or more categories of said one or more datasets on a user interface of a display screen, based on at least a count of occurrences of said one or more events associated with said one or more categories.

7. The method of claim 6 further comprising rendering, by said processor, one or more graphical representations of said determined one or more categories on a user interface, wherein said one or more graphical representations are representative of one of: a spatial distribution, a temporal distribution, and a frequency distribution of said one or more datasets.

8. The method of claim 7 further comprising receiving, by said processor, one or more input parameters from a user computing device over a communication network, wherein said one or more input parameters are indicative of one or more preferences of a user associated with said user computing device for said one or more graphical representations.

9. A system for correlation detection among events based on datasets from multiple data sources, said system comprising:
one or more processors configured to:
extract one or more datasets from each of a one or more data sources over a communication network, wherein said one or more datasets include at least information about one or more events in a geographical area;
identify a primary data source and one or more secondary data sources from said one or more data sources based on a first pre-defined criteria;
extract one or more primary features from said one or more datasets associated with said primary data source, and one or more secondary features from said one or more datasets associated with said one or more secondary data sources, wherein said one or more primary features are categorized into one or more categories based on a second pre-defined criteria;
train one or more classifiers based on at least one of said one or more primary features and said one or more categories of said one or more primary features; and detect a correlation among said information associated with said one or more events based on a category transfer distribution from said primary data source to said one or more secondary data sources, wherein said one or more secondary features are categorized based on the category transfer distribution using one or more trained classifiers for said determination of said correlation, wherein said first pre-defined criteria is based on a set of rules defined by a requestor, a reliability score associated with said one or more data sources, and a count of datasets extracted from each of said one or more data sources, and wherein said second pre-defined criteria is based on at least a dictionary associated with said primary data source.

10. The system of claim 9, wherein said one or more datasets further include at least a type of said one or more events and spatio-temporal information of said one or more events.

11. The system of claim 9, wherein said one or more data sources correspond to one or more of: one or more social media sources, one or more open data websites, one or more databases storing telephonic or mobile conversations, and one or more complaint databases associated with one or more domains.

12. The system of claim 9, wherein said one or more primary features and said one or more secondary features are extracted based on at least content and spatio-temporal information associated with said one or more datasets.

13. The system of claim 9, wherein said one or more categories may correspond to at least one of: one or more types of objections in said geographical area and one or more types of domains, wherein said one or more types of domains correspond to one of: a business domain, a health domain, a traffic domain, a society domain, and a regional domain.

14. The system of claim 9, wherein said one or more processors are further configured to render said determined one or more categories of said one or more datasets on a user interface of a display screen, based on at least a count of occurrences of said one or more events associated with said one or more categories.

15. The system of claim 14, wherein said one or more processors are further configured to render one or more graphical representations of said determined one or more categories on a user interface, wherein said one or more graphical representations are representative of one of: a spatial distribution, a temporal distribution, and a frequency distribution of said one or more datasets.

16. The system of claim 14, wherein said one or more processors are further configured to receive one or more input parameters from a user computing device over said communication network, wherein said one or more input parameters are indicative of one or more preferences of a user associated with said user computing device for said one or more graphical representations.

17. The system of claim 14, wherein said one or more processors are further configured to render one or more updated graphical representations of said determined one or more categories on said user interface based on at least said received one or more input parameters.

18. A computer program product for use with a computer, the computer program product comprising a non-transitory computer readable medium, wherein the non-transitory computer readable medium stores a computer program code for correlation detection among events based on datasets from multiple data sources, wherein the computer program code is executable by one or more processors to:

extract one or more datasets from each of one or more data sources over a communication network, wherein said one or more datasets include at least information about one or more events in a geographical area;

identify a primary data source and one or more secondary data sources from said one or more data sources based on a first pre-defined criteria, wherein said first pre-defined criteria is based on a set of rules defined by a requestor, a reliability score associated with said one or more data sources, and a count of datasets extracted from each of said one or more data sources;

extract one or more primary features from said one or more datasets associated with said primary data source, and one or more secondary features from said one or more datasets associated with said one or more secondary data sources, wherein said one or more primary features are categorized into one or more categories based on a second pre-defined criteria, wherein said second pre-defined criteria is based on at least a dictionary associated with said primary data source;

train one or more classifiers based on at least one of said one or more primary features and said one or more categories of said one or more primary features; and detect a correlation among said information associated with said one or more events based on a category transfer distribution from said primary data source to said one or more secondary data sources, wherein said one or more secondary features are categorized based on the category transfer distribution using one or more trained classifiers for said determination of said correlation.

\* \* \* \* \*